No. 699,711. Patented May 13, 1902.
J. M. PYOTT, Jr.
FISH HOOK.
(Application filed Mar. 10, 1902.)
(No Model.)
Fig. 1.
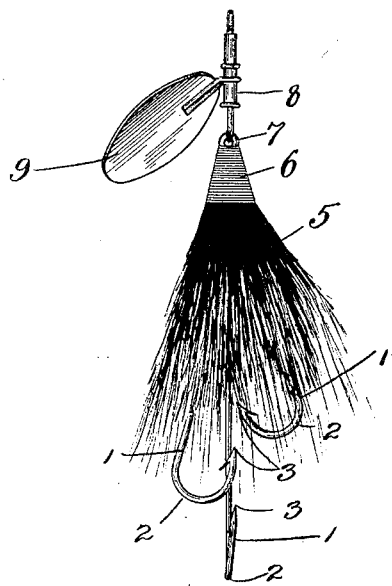
Fig. 2. Fig. 3. Fig. 4.
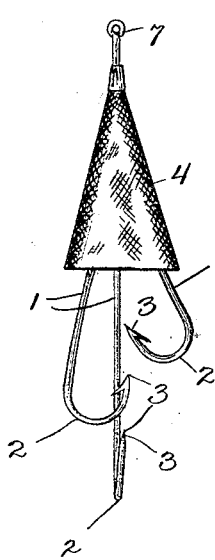 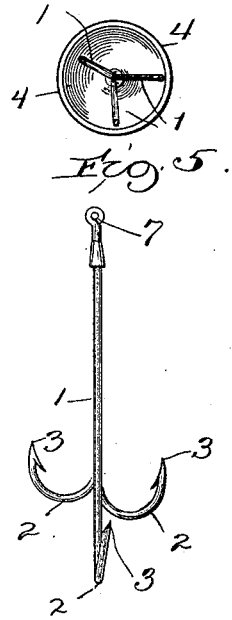 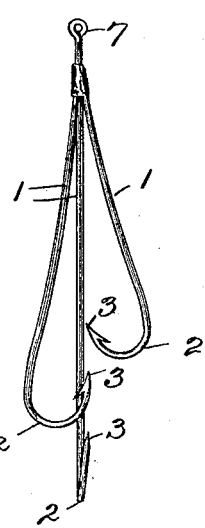
Fig. 5.
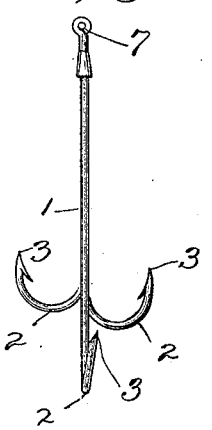
Witnesses:
Harry O. White
Ray White
Inventor
James M. Pyott Junior.
By Jesse + H. M. Cox
Attys

UNITED STATES PATENT OFFICE.

JAMES M. PYOTT, JR., OF CHICAGO, ILLINOIS.

FISH-HOOK.

SPECIFICATION forming part of Letters Patent No. 699,711, dated May 13, 1902.

Application filed March 10, 1902. Serial No. 97,513. (No model.)

*To all whom it may concern:*

Be it known that I, JAMES M. PYOTT, Jr., a citizen of the United States, residing in the city of Chicago, county of Cook, State of Illinois, have invented a new and useful Improvement in Fish-Hooks, of which the following is a specification.

My invention relates to fish-hooks; and the object is to provide means for preventing the hook from becoming fouled by weeds or other obstructions when being drawn through the water. I attain this object by the device illustrated in the accompanying drawings, in which—

Figure 1 is a side view of the complete device. Fig. 2 is a side view of the device with the outer covering or guard removed, showing the guard-support. Fig. 3 is a view of the hooks and guard-support looking from beneath. Fig. 4 is a side view of the bare hooks, the guard and support thereof being removed; and Fig. 5 shows the points of the hooks projecting outwardly, due to the bringing of the shanks of the hooks together in the operation of the device.

Similar numerals refer to similar parts throughout the several views.

The hooks 1 are three in number and so arranged that their planes lie at equal angles with reference to each other, said hooks therefore lying in planes approximately one hundred and twenty degrees apart. The shanks of the hooks are soldered or otherwise joined together at their upper extremities in such a position that the points are toward the interior and lie substantially along the central axis of the device. Said hooks are of different lengths, so that the bend 2 of one hook clears the point 3 of the next longer hook. The shanks of the hooks are resilient and of sufficient stiffness to retain the hooks in their normal position unless an exterior force be applied.

At or near the point where the shanks of the hooks are joined is secured a guard-support 4, which is approximately cone-shaped and incloses a portion of the shanks of the hooks. Said support is collapsible and consists, preferably, of rubber. By reason of its configuration said support does not present great resistance when the device is passing through the water, but affords protection to the points of the hooks in the manner hereinafter described.

Around the outside of the guard-support is placed an outer covering or guard 5, which consists of bristles, badger-hair, feathers, or any other suitable material. The purpose of the feather or bristles which constitute the guard is threefold—namely, to permit the device to glide by weeds or other obstructions without allowing the same to gain access to the points of the hooks; second, to hide the nature of the device, and, third, to attract the attention of the fish. The purpose of the guard-support 4 is to supplement the stiffness of the guard and prevent the same from collapsing too easily. By preference the said bristles or feathers are secured at the apex of the guard-support 4 by means of the wrapping 6 and are trained along said support, so as to project below the rim thereof. Above said wrapping is the eye 7, to which may be attached a link 8, bearing a spoon 9.

In the use of the device a fishing-line is attached to the link 8 and when drawn through the water the hooks will trail at the rear behind the guard and guard-support. As the points of the hooks lie within the area covered by the base of the guard, when the device comes into contact with a weed or other obstruction the flaring guard 5 will cause the device to be forced aside by said obstruction and the points of the hooks will be prevented from fouling therewith. By this construction the hooks are protected and are therefore "weedless." When a fish attempts to seize the bait and closes his jaws down upon the shanks of the hooks, the shanks are forced toward each other, which causes the hooks to project in the manner shown in Fig. 5. As the guard 5 and the support 4 for said guard are collapsible, they do not interfere with the action of the jaws of the fish upon the shanks of the hooks. When the points of the hooks are projected, any one or all of them may catch in the mouth of the fish and prevent its escape.

An especial feature of my device results from the particular arrangement of the hooks as shown and described, whereby all three of the hooks are of different lengths and so proportioned that the point of none of them can interfere with the point or bend of either of the other hooks. Inasmuch as no two hooks lie in the same plane, the danger of the hooks becoming fouled one with another is reduced to a minimum.

What I claim as new, and desire to secure by Letters Patent, is—

1. In a device of the class described, the combination of three hooks secured together at the shanks thereof, the planes of said hooks being approximately equidistant, and the points of said hooks projecting inwardly and lying approximately in the axial line of the device.

2. In a device of the class described, the combination of three hooks lying in approximately equidistant planes with the points of said hooks projecting inwardly; and means for securing said hooks together at different lengths, the bend of one hook lying nearer the common joint than the point of the next longer hook.

3. In a device of the class described, the combination of hooks joined at the upper ends of their shanks and having their points projecting inwardly; and a guard secured to the shanks of the hooks near the joint thereof, said guard being trained toward the points of said hooks for preventing access of weeds thereto.

4. In a device of the class described, the combination of hooks joined at the upper ends of their shanks and having their points projecting inwardly; a guard secured to the shanks of said hooks; and a support for supplementing the stiffness of said guard to maintain the same distended.

5. In a device of the class described, the combination of hooks joined at the upper ends of their shanks and having their points projecting inwardly; a guard of fibrous material fastened to the shanks of said hooks near the joint thereof and trained toward the points of the hooks; and a flexible cone secured to and encircling the shanks of said hooks, said cone lying beneath said guard to support the same.

6. In a device of the class described, the combination of three hooks joined together at the shanks thereof, the planes of said hooks being approximately equidistant and the points of said hooks lying approximately on the axis of the device, and said hooks being of different lengths, the bend of any one of said hooks lying nearer the upper end of the device than the point of the next longer hook; a guard secured to the shanks of said hooks and extending toward the points thereof; and a collapsible support beneath said guard for normally maintaining the same in a distended condition.

JAMES M. PYOTT, Jr.

Witnesses:
ARTHUR M. COX,
SADIE WOLF.